US007425370B2

(12) United States Patent
Nishiyama et al.

(10) Patent No.: US 7,425,370 B2
(45) Date of Patent: Sep. 16, 2008

(54) LAMINATED STRUCTURAL BODY

(75) Inventors: Yuko Nishiyama, Tokyo (JP); Yoshihide Arai, Tokyo (JP); Takashi Nemoto, Tokyo (JP); Manabu Inoue, Tokyo (JP); Kenichi Horie, Tokyo (JP)

(73) Assignee: Three Bond Co., Ltd., Tokyo (JP)

( * ) Notice: Subject to any disclaimer, the term of this patent is extended or adjusted under 35 U.S.C. 154(b) by 489 days.

(21) Appl. No.: 10/533,239

(22) PCT Filed: Nov. 10, 2003

(86) PCT No.: PCT/JP03/14260

§ 371 (c)(1),
(2), (4) Date: Apr. 29, 2005

(87) PCT Pub. No.: WO2004/048085

PCT Pub. Date: Jun. 10, 2004

(65) Prior Publication Data

US 2006/0088706 A1 Apr. 27, 2006

(30) Foreign Application Priority Data

Nov. 25, 2002 (JP) ............................ 2002-341033

(51) Int. Cl.
*B05D 3/02* (2006.01)
*B32B 7/02* (2006.01)

(52) U.S. Cl. ........................ 428/413; 428/212; 428/336; 428/337; 428/411.1; 428/520; 428/522; 427/386

(58) Field of Classification Search ................. 428/212, 428/336, 337, 411.1, 413, 520, 522; 427/386
See application file for complete search history.

(56) References Cited

U.S. PATENT DOCUMENTS 3,833,404 A 9/1974 Sperling et al.
4,346,782 A 8/1982 Böhm
6,277,903 B1 * 8/2001 Sophiea et al. .............. 523/428

FOREIGN PATENT DOCUMENTS

| | | | |
|---|---|---|---|
| JP | 53-145851 | A | 12/1978 |
| JP | 55-17532 | A | 2/1980 |
| JP | 55-41844 | A | 3/1980 |
| JP | 58-18891 | U | 2/1983 |
| JP | 59-16969 | Y2 | 5/1984 |
| JP | 59-19930 | Y2 | 6/1984 |
| JP | 59-23203 | Y2 | 7/1984 |
| JP | 60-73148 | A | 4/1985 |
| JP | 2228467 | A | 9/1990 |
| JP | 4174585 | A | 6/1992 |
| JP | 2000-25536 | A | 1/2000 |

* cited by examiner

*Primary Examiner*—Bruce H Hess
*Assistant Examiner*—Lawrence D Ferguson
(74) *Attorney, Agent, or Firm*—Sughrue Mion, PLLC

(57) ABSTRACT

An object of the present invention is to provide a damping and soundproofing member not only excellent in an excellent damping and soundproofing effect but also excellent in easiness of forming thereof, especially capable of forming directly a damping and soundproofing layer on a substance to be adhered and further excellent in lightness, washing ability, durability, and the like.

The invention relates to a structure formed by laminating cured product layers formed from plurality of fluid resin compositions on a substrate expecting a damping or soundproofing effect, wherein at least two cured product layers of the above cured product layers are different in hardness. Moreover, preferably, no part of the hardest layer in the above cured product layers is directly formed on the substrate and the hardest layer is formed on the substrate via an intermediate layer.

21 Claims, No Drawings

LAMINATED STRUCTURAL BODY

FIELD OF THE INVENTION

The present invention relates to a damping and soundproofing structure wherein laminated cured product layers of fluid resin compositions are formed on a substrate expecting a damping and soundproofing effect. Particularly, it relates to a damping and soundproofing structure to be used as a cover for devices such as information-recording devices, information-related devices, information-communicating devices, acoustic devices, and game-related devices for the purpose of damping vibration and proofing sound.

BACKGROUND ART

Heretofore, since the information-recording devices such as HDD where a disk having recorded information is rotated possess moving parts, e.g., a motor to rotate the disk and a head to read and write information on the disk, vibration generated from themselves and vibration and sound leaked out of the devices through sympathetic vibration of the other parts derived from the vibration of the moving parts become a big problem. With regard to the motor, a remarkable improvement in vibration and sound has been achieved by changing a conventional bearing system into a fluid dynamic bearing but the improvement is not perfect.

Accordingly, an article like an aluminum tape, a metal plate made of, e.g., aluminum or stainless steel, a common vulcanized rubber sheet, or the like is adhered as a damping material to the devices themselves with an adhesive or a double-faced adhesive tape. Moreover, vibration damping becomes an important problem in compact and lightweight devices, for example, optical disks such as mini-disk and DVD, and compact videos. For solving such problems, there have been proposed a damping material using a specific thermoplastic material (JP-A-9-235477) and a damping material comprising a styrene-vinylisoprene-styrene block copolymer, a thermoplastic material, and a softener (JP-A-10-204249).

With regard to the above damping and soundproofing materials, a damping and soundproofing material having a desired shape is in principle obtained from a sheet-shape article by stamping out with a trimming die, but the trimming die is expensive, so that the cost of the damping and soundproofing material becomes high as a natural consequence in the case that the required number of the damping and soundproofing material is small. In the case of precision devices, since a trouble may arise when minute dusts invade inside the devices, individual parts are washed prior to their assembling. When the damping material is adhered with an adhesive or a double-faced adhesive tape, a member to which the damping material is adhered is washed in order to remove dusts attached at the adhesion process, but there arises a problem that detergent liquid penetrates into the adhesive layer and some troubles may be caused later. For avoiding this problem, the washing is sometimes not carried out, but in that case, non-washing may also cause staining of the precision devices.

Further, the use of a metal plate, especially stainless steel plate as a damping and soundproofing material is not adequate for the devices to be lightweight owing to the weight. In the case of vulcanized rubber sheets, when the thickness is thinned for saving weight and size, the strength of the sheets decreases and they are easy to be damaged at the molding, so that it is difficult to increase productivity. In addition, there is a fear that sulfur of a vulcanizing agent may remain and affect electronic parts. Moreover, with regard to silicone rubbers, there is a problem that staining of electrical contact points with a low molecular weight siloxane may be generate.

Furthermore, since the damping materials disclosed in JP-A-9-235477 and JP-A-10-204249 are necessarily molded thermally using an injection molding machine or the like, there is a problem similar to the case of the above rubber sheets that a damping layer should be formed beforehand and be bonded to a substance to be adhered when the damping layer cannot be formed directly to the substance to be adhered depending on the material and shape of the substance to be adhered.

DISCLOSURE OF THE INVENTION

The present invention is made in view of the above problems and an object thereof is to provide a damping and soundproofing member not only excellent in a damping and soundproofing effect but also excellent in easiness of forming thereof, especially capable of forming directly a damping and soundproofing layer to a substance to be adhered and further excellent in lightness, washing ability, durability, and the like.

The object of the present invention set forth above has been achieved by providing following laminated structure.

1. A laminated structure comprising: a substrate expecting a damping or soundproofing effect; and laminated cured product layers formed from plurality of fluid resin compositions provided on the substrate, wherein at least two of the cured product layers are different in hardness.

2. The laminated structure according to item 1, wherein the hardest layer in the cured product layers has a hardness (JIS-D hardness) of 70 or more.

3. The laminated structure according to item 1, wherein the hardest layer in the cured product layers has a thickness of 10 μm or less.

4. The laminated structure according to item 1, wherein the softest layer in the cured product layers has a hardness (JIS-A hardness) of 80 or less.

5. The laminated structure according to item 1, wherein the softest layer in the cured product layers has a thickness of 10 μm or more.

6. The laminated structure according to item 1, wherein no part of the hardest layer in the cured product layers is directly formed on the substrate.

7. The laminated structure according to item 6, wherein the hardest layer in the above cured product layers is formed on the substrate via an intermediate layer.

8. The laminated structure according to item 1, wherein the cured product layers are composed of two layers.

9. The laminated structure according to item 1, wherein the hardest layer in the cured product layers has a specific gravity of 1.4 or more.

10. The laminated structure according to item 1, wherein the cured product layers are formed on at least part of the substrate.

11. The laminated structure according to item 1, wherein the substrate has concave part on its surface, and wherein the cured product layers are formed on the concave part of the substrate.

12. The laminated structure according to item 1, wherein the cured product layers are formed on at least one side of the substrate.

13. The laminated structure according to item 1, wherein the cured product layers comprise plurality of cured product layers different in glass transition temperature.

14. The laminated structure according to item 1, wherein the cured product layers are formed by applying and curing the fluid resin compositions.

15. The laminated structure according to item 1, wherein the cured product layers are sequentially formed by applying and curing the respective fluid resin composition.

16. The laminated structure according to item 1, wherein the substrate is a thin plate-shape having a thickness of 2 mm or less.

17. The laminated structure according to item 1, wherein the substrate is a cover part for an apparatus generating vibration and sound.

18. The laminated structure according to item 1, wherein the fluid resin compositions forming the cured product layers each has curability selected from the group consisting of energy beam curability, thermal curability, moisture curability, and multi-liquid mixing curability.

19. The laminated structure according to item 1, wherein the fluid resin compositions forming the cured product layers each contains no tin compound.

20. The laminated structure according to item 1, wherein the fluid resin compositions forming the each cured product layers each contains no low molecular weight siloxane.

21. The laminated structure according to item 1, wherein the fluid resin compositions forming the cured product layers each has a total content of anionic constituents of 100 ppm or less.

22. The laminated structure according to item 1, wherein the cured product layers each gives an outgas amount of 100 ppm or less.

Having the constitutions as described above, transmittance of vibration and sound from original sources of vibration and sound can be inhibited.

BEST MODE FOR CARRYING OUT THE INVENTION

In the invention, the structure is formed by laminating cured product layers forming from plurality of fluid resin compositions on a substrate expecting damping or soundproofing effect, but individual cured product layers to be formed may be any cured product layers different in hardness from each other. For example, the cured product layers may comprise cured product layers of fluid resin compositions entirely different in kind from each other or may comprise cured product layers of the same kind of fluid resin compositions by differentiating individual hardness of the cured product layers. The larger layer number of the cured product layers to be laminated acts advantageously on a damping effect in many cases, but in consideration of actual processability, cost, damping and soundproofing properties, and the like, preferable number of the laminated layers is one to five layers, and more preferable number of the laminated layers is two to three layers. In this connection, it need scarcely be said that larger number of the laminated layers is more preferable when damping and soundproofing properties are pursued.

In the case that plurality of the cured product layers formed on a substrate have a two-layer structure, layers having different hardness, i.e., a soft layer and a hard layer are to be laminated. For exhibiting better damping and soundproofing effect, it is preferable to form a soft layer and then a hard layer from a substrate side. Moreover, in the case that the cured product layers have a structure having three or more layers, it is sufficient that adjacent two layers are different in hardness from each other. For example, in the case of a three-layer structure, the structure may have a cured product layer having a different hardness held tightly with two cured product layers having the same hardness or three layers different in hardness from one another may be laminated.

In this connection, the term “soft” or “hard” herein means relative hardness. In more preferred embodiments of the invention, the hardness of a soft layer (the softest layer in the case of a structure having three or more layers) is 80 or less, more preferably 20 to 80, in terms of a value measured using a JIS-A hardness testing machine, and the hardness of a hard layer (the hardest layer in the case of a structure having three or more layers) is 70 or more, more preferably 70 to 100, in terms of a value measured using a JIS-D hardness testing machine. Even without the ranges, it is possible to exhibit an aimed damping and soundproofing effect by thickening the cured product layers or increasing the number of the laminated layers.

Furthermore, thicker cured product layer in the invention acts advantageously on the damping and soundproofing effect in many cases, but in consideration of actual processability, cost, weight, size as a final product, damping and soundproofing properties, and the like, the thickness of one cured product layer is 0.01 to 2 mm, preferably 0.1 to 1 mm and the total thickness of the laminated layers is 0.1 to 3 mm, preferably 0.2 to 2 mm. The thickness of each layer constituting the plurality of layers may be the same or different.

Moreover, in the case that the cured product layers of fluid resin compositions formed on a substrate expecting a damping and soundproofing effect is plurality of layers, the cured product layer(s) of fluid resin composition(s) other than the cured product layer of a fluid resin composition formed directly on a substrate expecting a damping and soundproofing effect preferably do not come into direct contact with the substrate expecting a damping and soundproofing effect. Particularly, it is preferable that the hardest layer does not come into direct contact with the substrate.

The hardness of each cured product layer in the invention is explained to be relative one, but it can be expressed by using another parameter. In that case, a glass transition temperature of the cured product layer is used. For example, the expression that the glass transition temperature of the cured product layer forming a hard layer is preferably higher than the glass transition temperature of the cured product layer forming a soft layer among cured product layers of fluid resin compositions used in the invention is possible. Specifically, the glass transition temperature of the cured product layer forming a soft layer is preferably −40 to 80° C. and that of the cured product layer forming a hard layer is preferably 70 to 150° C., and more preferably, the former is 0 to 70° C. and the latter is 80 to 140° C. In this connection, with regard to the temperature at which the glass transition temperature of the hard layer overlaps with that of the soft layer, when the glass transition temperature of the hard layer is 80° C., the problem may be solved by setting the glass transition temperature of the soft layer to a temperature lower than 80° C.

The fluid resin composition for use in the invention means a resin composition having such a degree of flowability that mechanical application by an applying apparatus, such as dispense application, screen printing, or transcription application is possible. In this sense, there is included a resin composition which is solid at room temperature but is softened upon heating to exhibit flowability, for example, a hot-melt resin. Specific examples of the fluid resin composition in the invention include various reactive resin compositions which are fluid at room temperature, solvent-evaporating type resin compositions wherein a thermoplastic resin is dissolved in solvent or water, emulsion-type aqueous resin compositions, hot-melt-type resin compositions mentioned above, and the like. In this connection, the cured products of the fluid resin composition in the invention include the cured products obtainable by reactive curing of reactive resin compositions, and in addition, solidified products obtainable by solvent vaporization of solvent-evaporating type resin compositions or emulsion-type aqueous resin compositions, or solidified products obtainable by cooling hot-melt resin compositions are also included in the cured products in the invention.

Preferred examples of the above fluid resin composition include reactive resin compositions which are liquid at room temperature, are capable of forming cured products easily within a short period, exhibit little shrinkage at curing, and exert little influence on the environment from the viewpoint of easy handling. The reactive resin compositions include acrylic resin compositions, epoxy resin compositions, urethane resin compositions, silicone resin compositions, modified silicone compositions, and the like, but are not limited thereto. Moreover, as reactive curing mechanisms of the above reactive resin compositions, a photoreaction, a thermal reaction, a reaction with moisture, an addition reaction, a condensation reaction, and the like are considered to be reaction modes, but in consideration of processability, it is preferable to have photopolymerizability, thermal polymerizability, or addition polymerizability basically by radical polymerization or cationic polymerization. More specific reactive resin compositions include (meth)acrylic ester resins, urethane(meth)acrylate resins, epoxy(meth)acrylate resins, urethane resins, one-component epoxy resins, two-component epoxy resins, and the like.

At the formation of individual cured product layers, as a reactive resin composition forming a soft layer, an acrylic ester resin or a urethane resin is preferably used and as a reactive resin composition forming a hard layer, an acrylic ester resin, an one-component epoxy resin, a two-component epoxy resin and a urethane resin may be mentioned. In this connection, the fluid resin composition for use in the invention may be a solvent-evaporating type resin, but in view of processing, the resin is not so preferable since it requires an explosion-proof equipment. In addition, it is not preferable since outgas is generated from the solvent component which has remained as a minute constituent.

In the case that an acrylic ester resin is used as the reactive resin composition, it is preferable to prepare it as a photo-curable resin composition from the viewpoint of its processability. Specifically, as the photo-curable resin composition, a urethane acrylate or epoxy acrylate having a molecular weight Mw of 1000 to 10000 is used as an oligomer component, which is diluted with a (meth)acrylate monomer such as 2-hydroxyethyl acrylate, or the like. As a polymerization initiator, a photo-initiator such as 2-hydroxyphenyl ketone (Ciba-Geigy, Irgacure #184) is added. In addition, various fillers such as silica, amorphous silica, talc, and alumina can be also added thereto for the purpose of improving applicability or the like. Moreover, it is also possible to add a silane coupling agent, a phosphate ester, or the like for the purpose of improving adhesiveness to the substrate. This acrylic ester resin can be suitably used for the formation of a soft cured product layer.

In the case that an epoxy resin is used as the reactive resin composition, it is preferable to use an one-component epoxy resin from the viewpoint of its processability. The one-component epoxy resin is mainly composed of a reactive resin having an epoxy group and a potent curing agent, and is reacted and cured upon heating. As the reactive resin having an epoxy group, compounds having one or more epoxy groups in one molecule can be used without limitation, and these compounds may be used singly or as a mixture of two or more of them. Specific examples of the reactive resin having an epoxy group include Epicoat 828 and 807 (manufactured by Japan Epoxy Resin K.K.), Epiclon 803 and 835LV (manufactured by Dainippon Ink & Chemicals, Incorporated), and the like. As the potent curing agent which reacts with the reactive resin having an epoxy group to cure it, dicyandiamine, FXE-1000 (manufactured by Fuji Kasei Kogyo Co., Ltd.), modified aliphatic amines, and the like. In addition, various fillers such as silica, amorphous silica, talc, alumina can be added thereto for the purpose of improving applicability or the like. Moreover, it is possible to add a silane coupling agent or the like for the purpose of improving adhesiveness to the substrate. In the case that a cured product layer is formed using the epoxy resin, it is preferable to use the cured product layer as a hard cured product layer. This is because a cured product of an epoxy resin generally tends to afford a hard cured product and has a high glass transition temperature. When a filler having a high specific gravity, such as a metal powder, is further added thereto, a hard cured product having a high specific gravity is obtained, so that a cured product having a high damping and soundproofing effect is easily obtained. In this connection, the hard cured product layer preferably has a specific gravity of 1.4 or more, more preferably 1.8 or more, but it may vary depending on the kind of a reactive resin or a filler.

Furthermore, the fluid resin composition is preferably does not contain any tin compound. Among tin compounds, organic tin compounds are especially highly volatile and hence there is a fear that the compounds may invite malfunction of articles themselves produced using the compounds, peripheral electronic parts and devices, and the like by reattachment or transcript of outgas constituent from cured products. Actually, there arises a big problem in HDD. In the case that a urethane (meth)acrylate for example is used as the fluid resin composition, it is preferable to use either an organic zinc or an amine compound without using any tin compound as the synthetic catalyst which is disclosed in WO99/51653.

The cured product of the fluid resin composition preferably contains a lesser outgas constituent and the content is preferably 100 ppm or less. This is because there is a fear that the outgas constituent may invite malfunction of articles themselves produced using the constituent, peripheral electronic parts and devices, and the like. The content of outgas constituent is generally analyzed by GC (Gas Chromatograph) or GC/MS (Gas Chromatograph-Mass Spectrometer). Particularly, analysis combined with DHS method (Dynamic Headspace Sampler method) is suitable. The conditions for extracting outgas constituent cannot be defined sweepingly, but the extraction conditions in the invention are defined as an extraction at 120° C. for 15 minutes.

Furthermore, the fluid resin composition preferably does not contain any low molecular weight siloxane. This is because there is a fear that the low molecular weight siloxane may invite malfunction of articles themselves produced using the siloxane, peripheral electronic parts and devices, and the like.

The fluid resin composition of the invention preferably contains a lesser content of total anionic constituents as its ionic constituent. Particularly, it is preferable for the composition that the total content of F, Cl, Br, $NO_2$, $NO_3$, $PO_4$, and $SO_4$ ions is 100 ppm or less. This is because there is a fear that the anionic constituents may invite corrosion or malfunction of articles themselves produced using the constituents, peripheral electronic parts and devices, and the like. The content of anionic constituents is generally analyzed by IC (Ion Chromatograph). The conditions for extracting anionic constituents cannot be defined sweepingly but the extraction conditions in the invention are defined as an extraction at 80° C. for 1 hour using purified water.

Specific examples of the substrate expecting a damping and soundproofing effect for use in the invention include home or in-car audio devices (cassette, CD, DVD, video, or AV devices carrying them, and accessory devices such as speakers and microphone), information-related devices (various personal computers carrying HDD, CD-ROM, DVD, MO, and the like, game machines, and so on), information-communicating devices such as mobile phones, PHS (Personal Handyphone System), and pocket beeper, and also cases and covers into which parts and apparatus, which is carried by printers, copiers, and the like and generates vibration and sound, are mentioned.

In the invention, it is necessary to form cured products formed from plurality of layers of fluid resin compositions on the above substrate. When the forming method is specifically explained, for example, the first fluid resin composition is applied on at least part of the surface of the substrate in a desired thickness and size and then the fluid resin composition is cured to form the first cured product layer. Then, the second fluid resin composition is applied on the above first cured product layer so as to be in the size equal or slightly smaller than the size of the first cured product layer (the thickness is optional) and the second cured product layer is formed to effect lamination so as to almost lap over the first cured product layer. By forming the layers in such a manner, the surface of the substrate can be strongly bonded to the first cured product layer and also the first cured product layer to the second cured product layer. At that time, it is extremely effective to form the second cured product layer so as not to come into direct contact with the surface of the substrate to achieve the object of the invention since a damping and soundproofing effect can be further enhanced. Furthermore, the third cured product layer and the fourth cured product layer may be further formed in the same manner as described above.

In an alternative method, a cured product A having a predetermined shape and a predetermined thickness is formed beforehand, and then for laminating this to the substrate, after the other fluid resin composition is applied to the surface of the substrate, the above cured product A formed beforehand is placed thereon and then the above fluid resin composition is cured to laminate a cured product layer B and a cured product layer A on the substrate.

The cured product layers to be formed and laminated on a thin plate-shape substrate may be formed any place on the substrate but, in order to obtain more effective damping and soundproofing effect, it is possible to form the layers on both front and back sides of the substrate. Moreover, the thin plate-shape substrate is molded in an appropriate thickness in order to reduce its weight and to facilitate bending processing. A thickness of the substrate is preferably 2 mm or less, for example, in the covering member of information recording devices, the thickness of the substrate is generally about 0.2 to 1.5 mm, and in some case, there are slight concavity and convexity in the surface so as to fit the member to the shape of a motor or electronic part to be housed its inside. In such a case, when laminated cured product layers of fluid resin compositions are formed so as to fit them to the concave shape formed on the surface of the substrate, a beautiful finish in appearance is afforded.

In the invention, it is advantageous and preferable to apply fluid resin compositions directly on the substrate successively to form cured product layers in view of processing, cost, and the like. Moreover, the applying method of the fluid resin compositions may be any method generally used. Specifically, screen printing, metal mask, spray application, stamping application, dispenser application, and the like may be mentioned. Dispenser application in combination with an automatic applying robot is most preferable, which is flexibly responsible to the properties, such as viscosity, of the fluid resin compositions and also to the change of shape of the substances to be applied (substrates) or which is advantageous in view of processing, cost, and the like.

EXAMPLES

The following will describe the invention with reference to Examples and Comparative Examples but the invention is not limited to these Examples.

In Examples and Comparative Examples, a dispenser in combination with an automatic applying robot was used at the application of fluid resin compositions on a substrate expecting a damping and soundproofing effect. Desired cured product layers were formed by photo-curing with UV irradiation at curing the formulations forming soft layers and by thermal curing using a heating furnace at curing the formulations forming hard layers. For evaluating the damping and soundproofing effect, a commercially available HDD (2.5 inch, 40 G, 4200 rpm) was purchased and, after forming the above cured product layers of fluid resin compositions in a predetermined thickness on the cover (about 70 mm×95 mm), the evaluation was carried out by driving the HDD actually. The applied area of the fluid resin compositions was about 20 $cm^2$ for both of soft layers and hard layers.

The following Formulations 1 and 2 were prepared as fluid resin compositions forming soft layers of a damping and soundproofing structure and the following Formulations 3 and 4 were prepared as fluid resin compositions forming hard layers, respectively, to obtain reactive resin compositions. At that time, all the individual raw materials used for preparation of the formulations were used after confirming contamination of no tin compound and no low molecular weight siloxane, and the preparation of the formulations were carried out carefully so that the constituents were not mixed in from devices used for the preparation of the formulations. When cured products of the prepared formulations were analyzed, the constituents were below detection limit.

The urethane acrylate for use in the following Formulations 1 and 2 was synthesized as follows. First, 36 g of a polyether obtainable by adding polypropylene ether to bisphenol A and having a hydroxy group at the terminal (trade name: Adeka Polyether BPX-11, manufactured by Asahi Denka K. K., molecular weight: about 360) was added to 50.05 g of diphenylmethane diisocyanate (MDI) in the presence of 0.04 g of zinc octylate of a reaction catalyst and an addition reaction was allowed to occur at 60 to 80° C. to obtain a polyisocyanate oligomer having an isocyanate group at the terminal. One hundred grams of hydroxyethyl acrylate which was equivalent to or more than the amount of the isocyanate group in the polyisocyanate oligomer was added to the oligomer and an addition reaction was allowed to occur at 60 to 80° C. in the presence of 0.04 g of zinc octylate as the reaction catalyst to obtain polyetherurethane acrylate having an acryl group at the terminal (Synthesis 1).

Formulation 1 (Photo-Curable Acrylic Resin Composition)

| | |
|---|---|
| Urethane acrylate (Synthesis 1) | 50 parts by weight |
| Tetrahydrofurfuryl acrylate | 50 parts by weight |
| Irgacure #184 (photo-initiator, manufactured by Ciba Specialty Chemicals) | 3 parts by weight |

Physical properties and analytical results after photo-curing are as follows:

JIS-A hardness: 50

Glass transition temperature: 10° C.

Content of outgas: 10 ppm

Content of total anionic constituents: 5 ppm

Formulation 2 (Photo-Curable Acrylic Resin Composition)

| | |
|---|---|
| Urethane acrylate (Synthesis 1) | 50 parts by weight |
| Phenoxy acrylate | 50 parts by weight |
| Irgacure #184 (photo-initiator, manufactured by Ciba Specialty Chemicals) | 3 parts by weight |

Physical properties and analytical results after photo-curing are as follows:

JIS-A hardness: 40

Glass transition temperature: 0° C.

Content of outgas: 8 ppm

Content of total anionic constituents: 7 ppm

Formulation 3 (Thermally Curable Epoxy Resin Composition)

| | |
|---|---|
| Epicoat 828 (Yuka Shell Epoxy K.K.) | 100 parts by weight |
| FXE-1000 (thermal curing agent, manufactured by Fuji Kasei Kogyo Co., Ltd.) | 20 parts by weight |
| AS-40 (alumina powder, manufactured by Showa Denko K.K.) | 100 parts by weight |

Physical properties and analytical results after thermal curing are as follows:

JIS-D hardness: 90

Glass transition temperature: 100° C.

Content of outgas: 1 ppm

Content of total anionic constituents: 30 ppm

Specific gravity: 1.8

Formulation 4 (Thermally Curable Epoxy Resin Composition)

| | |
|---|---|
| Epicoat 828 (Yuka Shell Epoxy K.K.) | 50 parts by weight |
| Epicoat 807 (Yuka Shell Epoxy K.K.) | 50 parts by weight |
| FXE-1000 (thermal curing agent, manufactured by Fuji Kasei Kogyo Co., Ltd.) | 20 parts by weight |
| AS-40 (alumina powder, manufactured by Showa Denko K.K.) | 100 parts by weight |

Physical properties and analytical results after thermal curing are as follows:

JIS-D hardness: 90

Glass transition temperature: 95° C.

Content of outgas: 1 ppm

Content of total anionic constituents: 30 ppm

Specific gravity: 1.8

Comparative Examples 1 to 6

Each of Formulations 1 to 4 was applied on the outer surface of the HDD cover in a desired thickness (applied area was about 20 $cm^2$) and sufficiently cured by light irradiation or heating to form a cured product layer, followed by its evaluation. The evaluation results were shown in Table 1. The evaluation was carried out through relative comparison with a blank cover on which no cured product layer was formed, and its damping and soundproofing property was evaluated. The criteria for judgment were as follows.

AA: A remarkable damping and soundproofing effect is observed.

A: A sufficient damping and soundproofing effect is observed.

B: A damping and soundproofing effect is observed (practically acceptable).

C: A slight effect is observed, but practically unacceptable.

D: No or little damping and soundproofing effect is observed.

TABLE 1

| | Comparative Example 1 | Comparative Example 2 | Comparative Example 3 | Comparative Example 4 | Comparative Example 5 | Comparative Example 6 |
|---|---|---|---|---|---|---|
| Formulation No. | 1 | 1 | 2 | 3 | 3 | 4 |
| Thickness of cured product (mm) | 0.2 | 0.4 | 0.2 | 0.2 | 0.4 | 0.2 |
| Damping and sound-proofing effect | C | C | C | D | C | D |

Examples 1 to 4

Each cured product layer was formed on the HDD cover in the order shown in Table 2. Formulation 1 or 2 was cured by UV irradiation after its application and Formulation 3 or 4 was cured by heating after its application. The thickness of the cured product layers of each layer was 0.2 mm and the shape and area of the cured product layers were the same as in Comparative Example 1. The second cured product layer was formed so as not to come into direct contact with the HDD cover. The evaluation results were shown in Table 2.

TABLE 2

| | Example 1 | Example 2 | Example 3 | Example 4 |
|---|---|---|---|---|
| Formulation No. of first layer | 1 | 1 | 2 | 2 |
| Formulation No. of second layer | 3 | 4 | 3 | 4 |
| Damping and Sound-proofing effect | A | A | AA | AA |

The criteria for evaluating the damping and soundproofing effect are the same as in Table 1.

Examples 5 to 6

Formulation 1 or 2 was applied on the HDD cover as the first cured product layer and cured, and Formulation 3 was applied thereon as the second cured product layer and cured. The thickness of the cured product layers of each layer was 0.2 mm and the shape and area of the cured product layers were the same as in Comparative Example 1. Formulation 3 forming the second cured product layer was applied so as to run over slightly from the first cured product layer and cured so as to come into direct contact with the HDD cover. The evaluation results were shown in Table 3.

Examples 7 to 8

Formulations 3 and 4 were applied on the HDD cover as the first cured product layer and cured by heating, and Formulation 1 was applied thereon as the second cured product layer and cured by UV irradiation. The thickness of the cured product layer of each layer was 0.2 mm and the shape and area of the cured product layers were the same as in Comparative Example 1. Formulation 1 of the above second cured product layer was applied and cured so as not to come into direct contact with the HDD cover. The evaluation results were shown in Table 3.

Examples 9 to 10

Each cured product layer was formed on the HDD cover in the order shown in Table 3. Formulation 1 or 2 was cured by UV irradiation after its application and Formulation 3 or 4 was cured by heating after its application. The thickness of the cured product layer of each layer was 0.2 mm and the shape and area of the cured product layers were the same as in Comparative Example 1. The second cured product layer and the following layers were formed so as not to come into direct contact with the HDD cover. The evaluation results were shown in Table 3.

TABLE 3

| | Example 5 | Example 6 | Example 7 | Example 8 | Example 9 | Example 10 |
|---|---|---|---|---|---|---|
| Formulation No. of first layer | 1 | 2 | 3 | 4 | 1 | 1 |
| Formulation No. of second layer | 3 | 3 | 1 | 1 | 2 | 3 |
| Formulation No. of third layer | — | — | — | — | 3 | 1 |
| Formulation No. of fourth layer | — | — | — | — | — | 3 |
| Damping and Sound-proofing effect | B | B | B | B | AA*1 | AA*1 |

The criteria for evaluating the damping and soundproofing effect are the same as in Table 1.
*1: The damping and soundproofing effect was very high but the thickness of the cured product layers increased and the weight increased.

From the results shown in Table 1, when even one layer of a soft cured product layer was formed on the surface of the substrate, a damping and soundproofing effect was observed although the effect was only a little. It is proved that the damping and soundproofing effect is higher in the case of a relatively soft cured product layer. Moreover, from Table 2, it is proved that the damping and soundproofing effect is higher in the case that a soft cured product layer is first formed on the substrate and then a hard cured product layer is formed thereon. Especially, it is also proved that the combination of cured product layers having a large difference in hardness in proximity to each other is more effective.

From the results shown in Table 3, even in the case that the substrate, soft cured product layer(s), and hard cured product(s) are laminated successively, it is proved that the damping and soundproofing effect is adversely effected when part of the hard cured product layer is directly bonded to the substrate. Moreover, when the cured product layers are laminated as three or more layers, the damping and soundproofing effect is enhanced but steps for the lamination increases and also the weight and thickness of the laminated cured product layers increase.

While the invention has been described in detail and with reference to specific embodiments, it will be apparent to one skilled in the art that various changes and modifications can be made therein without departing from the spirit and scope thereof.

The present application is based on Japanese Patent Application No. 2002-341033 filed on Nov. 25, 2002, and the contents are incorporated herein by reference.

INDUSTRIAL APPLICABILITY

According to the invention, a remarkable damping and soundproofing effect is obtained by laminating at least two layers of cured product layers different in hardness on the surface of a substrate requiring vibration-damping and soundproofing. Especially, the effect is enhanced by forming a hard cured product layer via a soft cured product layer on the surface of the substrate and also by forming the hard cured product layer so as not to come into direct contact with the substrate. Furthermore, larger difference in hardness between the soft cured product layer and the hard cured product layer tends to improve the effect.

In addition, since fluid resin compositions are used for the formation of the cured product layers, it is possible to form the cured product layers (damping and soundproofing layers) by applying the compositions on any place independent of the shape and size of the substrate (substance to be adhered), so that productivity is improved as compared with the method of adhering a sheet-shape vibration damping and soundproofing material. Furthermore, since the bonding to the substrate or between the cured product layers is effected by curing the fluid composition(s), secure lamination is possible and detachment of the cured product layer(s) hardly occurs, so that change of the damping and soundproofing effect with time is also little. Particularly, when reactive resin compositions are selected as the fluid resin compositions, the formation of the cured product layers after the application on the substrate can be rapidly carried out, for example, by photocuring or thermal curing, so that productivity is remarkably improved.

Furthermore, when reactive resin compositions with little outgas or eluting ions are used as the cured products, the use of the compositions in precision electronic parts such as HDD may not contaminate the parts and hence quality of the precision electronic parts can be improved to a large extent.

What is claimed is:

1. A damping or soundproofing method for a substrate by forming at least two layers on at least one portion of the substrate, wherein the at least two layers comprise:

a first cured product layer disposed on the substrate, wherein the first cured product layer is formed from a reactive fluid acrylic resin composition, wherein the reactive fluid acrylic resin composition comprises a composition including a resin selected from the group consisting of (meth)acrylic ester resin, urethane (meth)acrylate resin and epoxy(meth)acrylate resin;

a photo-initiator; and a (meth)acrylate monomer; and a second cured product layer disposed on the first cured product layer, wherein the second cured product layer is formed from a reactive fluid epoxy resin composition.

2. The damping or soundproofing method according to claim 1, wherein the at least two layers are formed by a process comprising:

forming the first cured product layer on the substrate; and forming the second cured product layer on the first cured product layer.

3. The damping or soundproofing method according to claim 1, wherein the at least two layers are formed by a process comprising:

applying the reactive fluid acrylic resin composition on the substrate to form a applied composition;

disposing the second cured product layer on the applied composition; and curing the applied composition to form the first cured product layer.

4. The damping or soundproofing method according to claim 1, wherein the first cured product layer is softer than the second cured product layer.

5. The damping or soundproofing method according to claim 1, wherein the reactive fluid acrylic resin composition is a photo-curable acrylic resin composition.

6. The damping or soundproofing method according to claim 1, wherein the reactive fluid epoxy resin composition comprises:

a reactive resin having an epoxy group; and a potent curing agent.

7. The damping or soundproofing method according to claim 6, wherein the reactive fluid epoxy resin composition further comprises a filler.

8. The damping or soundproofing method according to claim 7, wherein the filler comprises a metal powder.

9. The damping or soundproofing method according to claim 1, wherein the second cured product layer has a hardness (JIS-D hardness) of 70 or more.

10. The damping or soundproofing method according to claim 1, wherein the second cured product layer has a thickness of 10 μm or more.

11. The damping or soundproofing method according to claim 1, wherein the second cured product layer has a specific gravity of 1.4 or more.

12. The damping or soundproofing method according to claim 1, wherein the first cured product layer has a hardness (JIS-A hardness) of 80 or less.

13. The damping or soundproofing method according to claim 1, wherein the first cured product layer has a thickness of 10 μm or more.

14. The damping or soundproofing method according to claim 1, wherein no part of the second cured product layer is directly formed on the substrate.

15. The damping or soundproofing method according to claim 1, wherein the substrate has a concave part on its surface, wherein the at least two layers are formed on the concave part.

16. The damping or soundproofing method according to claim 1, wherein the at least two layers are formed on at least one surface of the substrate.

17. The damping or soundproofing method according to claim 1, wherein the at least two layers comprise plurality of cured product layers different in glass transition temperature.

18. The damping or soundproofing method according to claim 1, wherein the at least two layers are formed from fluid resin compositions each containing no tin compound.

19. The damping or soundproofing method according to claim 1, wherein the at least two layers are formed from fluid resin compositions each containing no low molecular weight siloxane.

20. The damping or soundproofing method according to claim 1, wherein the at least two layers comprise cured product layers each gives an outgas amount of 100 ppm or less.

21. The damping or soundproofing method according to claim 1, wherein the substrate is a cover part for a HDD.

* * * * *